United States Patent [19]

Tognazzo

[11] Patent Number: 5,310,411
[45] Date of Patent: May 10, 1994

[54] PROCESS AND MACHINE FOR THE TRANSFORMATION OF COMBUSTIBLE POLLUTANTS OF WASTE MATERIALS INTO CLEAN ENERGY AND USABLE PRODUCTS

[76] Inventor: Valerio Tognazzo, Via 7 F.lli Cervi, 18, I-35031 Abano Terme, Italy

[21] Appl. No.: 455,350
[22] PCT Filed: May 27, 1988
[86] PCT No.: PCT/EP88/00478
§ 371 Date: Jan. 18, 1990
§ 102(e) Date: Jan. 18, 1990
[87] PCT Pub. No.: WO88/09363
PCT Pub. Date: Dec. 1, 1988

[30] Foreign Application Priority Data

May 28, 1987 [IL] Israel .................. 41606 A/87

[51] Int. Cl.$^5$ .............................. B01J 3/00
[52] U.S. Cl. ........................ 48/62 R; 48/69; 48/111; 48/128
[58] Field of Search ............... 48/69, 67, 197 R, 111, 48/209, 62 R, 203, 128; 252/373; 423/656, DIG. 18; 110/238, 262; 429/17, 19

[56] References Cited

U.S. PATENT DOCUMENTS

| | | | |
|---|---|---|---|
| 2,699,384 | 1/1955 | Peeny | 48/69 |
| 2,947,797 | 8/1960 | Justi et al. | 429/13 |
| 4,019,444 | 4/1977 | Kleeberg et al. | 422/169 |
| 4,305,846 | 12/1981 | Jennings | 423/656 |
| 4,334,892 | 6/1982 | Livemore | 48/67 |
| 4,437,864 | 3/1984 | Gorris et al. | 48/67 |
| 4,525,176 | 6/1985 | Koog et al. | 252/373 |
| 4,547,203 | 10/1985 | Jahnke | 252/373 |
| 4,615,285 | 10/1986 | Bentell et al. | 48/197 R |
| 4,707,163 | 11/1987 | Gudymov et al. | 48/69 |
| 4,721,611 | 1/1988 | Pinto et al. | 423/656 |

FOREIGN PATENT DOCUMENTS

| | | |
|---|---|---|
| 0057029 | 4/1982 | European Pat. Off. |
| 1208026 | 12/1965 | Fed. Rep. of Germany |
| 2160219 | 12/1985 | United Kingdom |

OTHER PUBLICATIONS

Stuart et al, "Synthesis gas Production from Peat Using a Steam Plasma", (1984) Plasma Chemistry & Plasma Processing vol. 4 (1984) pp. 297–313.
Riegel, "Fuels, Steam boilers, hydroelectric power", Industrial Chemistry (1949) pp. 243–247.

*Primary Examiner*—Robert J. Warden
*Assistant Examiner*—Hien Tran
*Attorney, Agent, or Firm*—Hoffman, Wasson & Gitler

[57] ABSTRACT

The process and apparatus for transforming combustible pollutants and waste materials into non-polluting, clean and useful energy, by completely removing the pollutants from raw materials while avoiding the formation of potential pollutants, involve the use of oxygen or a gas mixture containing oxygen, such as air, and steam.

29 Claims, 3 Drawing Sheets

PROCESS AND MACHINE FOR THE TRANSFORMATION OF COMBUSTIBLE POLLUTANTS OF WASTE MATERIALS INTO CLEAN ENERGY AND USABLE PRODUCTS

BACKGROUND OF THE INVENTION

This invention relates to a process and a machine for the transformation of combustibile pollutants or waste materials into clean energy and utilizable products.

It is known to carry out the thermodecomposition of combustible pollutants, such as urban or industrial waste materials, by oxidizing such wastes in controlled conditions of temperature and excess of air and to use the elevated heat developed by the fumes to produce both thermic and electric energy.

However, this well known technique of waste disposal with energy regeneration is only modestly efficient and causes dangerous emissions of harmful substances and micropollutants.

"Plasma Chemistry and Plasma Processing" Vol. 4, No. 4, December 1984, Plenum Publishing Corp., New York, U.S.A., discloses a gasification method of peat by using a steam plasma in order to obtain a high gasification efficiency..

EP-A1-0 194 252 discloses a gasification method which purifies the raw gas produced from tar.

However, up to date the gasification method has not found a wide spread since the problems concerning the high total energetic yield, the elimination of pollutants and the economical convenience have not found a satisfactory unitary solution.

SUMMARY OF THE INVENTION

An aim of the invention is to optimize the gasification method by entirely overcoming all the problems above referred to, that is to carry out a transformation of combustible pollutants or waste materials with total energy regeneration, obtaining clean energy and utilizable products, and realizing this process in an economical way.

A further aim of the invention is to carry out the disposal of urban, industrial and agricultural waste aggregates of all types, particularly solid waste materials, black liquor sludge, combustible pollutants etc.

A further aim of the invention is to carry out the disposal of wastes and combustible pollutans with a machine that allows a rapid recovery of its construction costs.

A further aim of the invention is to dispose of waste materials obtaining products that are completely utilizable in industry, the construction business, agriculture etc.

These aims and other that result hereinafter are achieved, according to the invention, by a process for transforming combustible pollutants and waste materials into clean energy and utilizable products, characterized by:

submitting the whole material to be treated to the action of a thermic lance at a temperature higher than 1600° C. in an airless atmosphere for a time sufficient to totally decompose it and extract combustible gases based on $H_2$ and CO, non-combustible gases and inerts, which are forwarded to the subsequent treatment steps without going through said material to be treated, suddenly cooling all together the thermally decomposed products and separating the inert products with water, thus generating steam and reducing the gases temperature at not less than 1200° C., introducing said steam and said cooled gases onto a depurative carbonaceous mass heated at a temperature higher than 1200° C., to remove the residual pollutants from the gases and to transform them, at least in part, into hydrogen, carbon monoxide and other wholly utilizable gaseous products, and cooling the gases coming out from the carbonaceous mass.

To carry out this process the invention comprises a machine characterized by comprising:

a thermic lance disgregator operating in absence of air and at a temperature higher than 1600° C. the whole decomposition of the material to be treated into combustible gases based on $H_2$ and CO, non-combustible gases and inerts, a water separator to suddenly cool together all the products thus decomposed and to separate the inert products with water, thus generating steam and reducing the gases temperature at not least than 1200° C., a filter-thermoreactor containing a depurative carbonaceous mass heated at a temperature higher than 1200° C., said filter-thermoreactor being connected to said disgregator and to said separator to remove the residual pollutants from the gases and to transform them, at least in part, into hydrogen, carbon monoxide and other wholly utilizable gaseous products, and a refrigerator for said gaseous products coming out from said filter-thermoreactor.

BRIEF DESCRIPTION OF THE DRAWINGS

This invention is herebelow further clarified with reference to the enclosed drawings, in which.

DESCRIPTION OF THE PREFERRED EMBODIMENT

Figure 1:
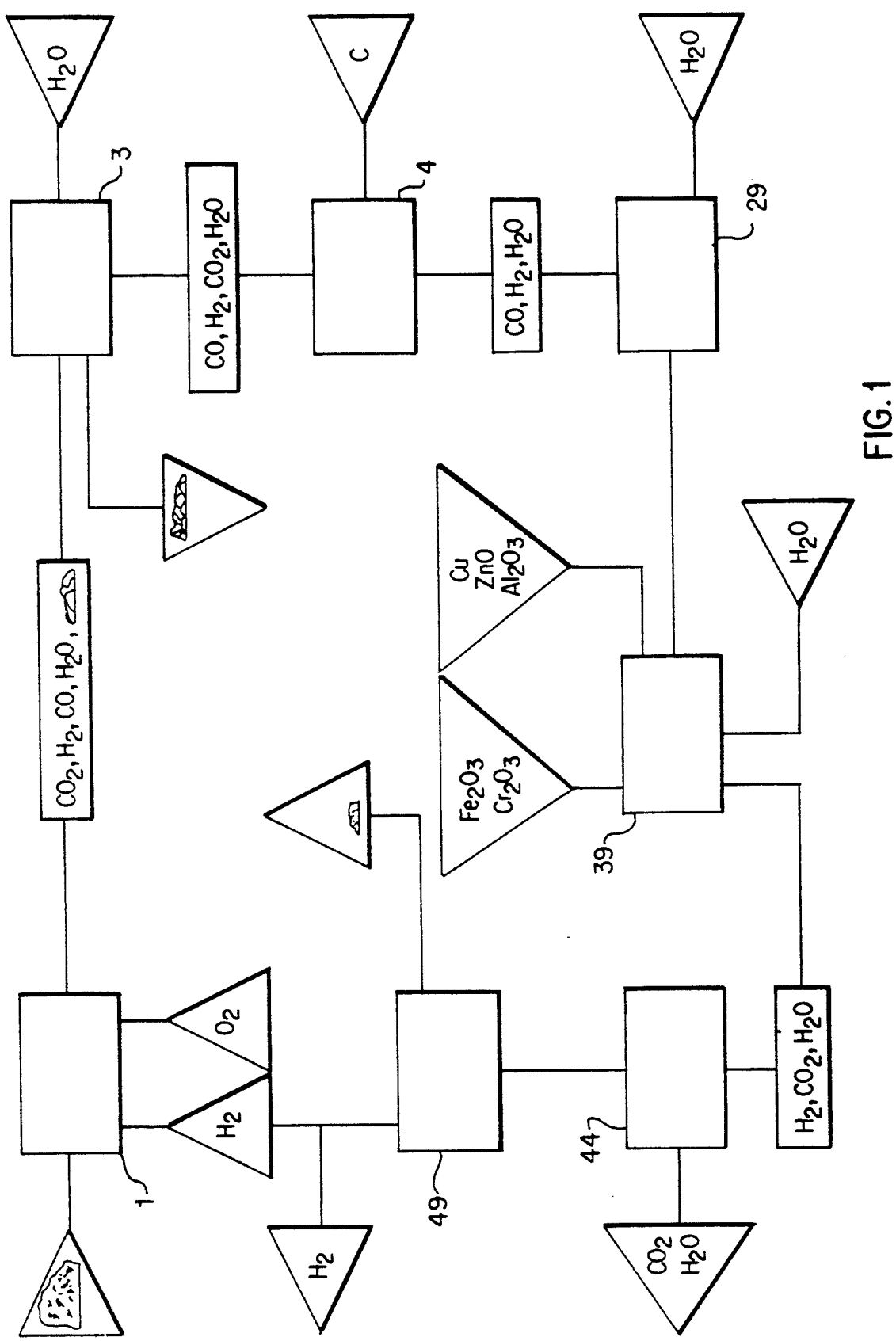
FIG. 1 shows a block diagram of the process according to the invention, FIG. 2 schematically shows a machine implementing the process.

As can be seen in FIG. 1, the process according to the invention foresees to introduce the material to be treated into a disgregator 1, where such a material is submitted to the action of an oxyhydrogen flame 2 which causes total thermal decomposition so as to extract combustible gases, non-combustible gases and inerts.

From the disgregator 1, essentially, a mixture of carbon dioxide, hydrogen, carbon monoxide, steam and waste fluid issue. The whole is allowed to fall into a mass of water 3, that cools the fluid and transforms it into inert solids, and is at the same time heated, thus generating steam.

The inert solids are removed for various uses (e.g. in the construction industry) while the gases mixed with the steam enter a filter-thermoreactor 4 containing carbonaceous material.

Here the carbon reacts with the steam to form carbon monoxide and hydrogen and to depurate and transform other gases. Since carbon reacts endothermically, the amount of heat needed for reaction comes from the disgregator 1.

From the filter-thermoreactor 4 hydrogen, carbon monoxide and other totally utilizable gaseous products issue.

These gases are then cooled by heat exchange and, after purification and steam enrichment, are introduced into a converter 39 where the carbon monoxide and steam, in the presence of a suitable catalyst, are converted into carbon dioxide and hydrogen, cooling down to about 200° C.

The carbon dioxide then solidifies by cooling to −70° C. while the hydrogen, passing through a filter 49, may be utilized in fuel cells for the production of electric energy.

When other catalysts are used in the converter 39, it is possible to convert the carbon monoxide and hydrogen into methane or to unite hydrogen and nitrogen to obtain ammonia.

Figure 2:
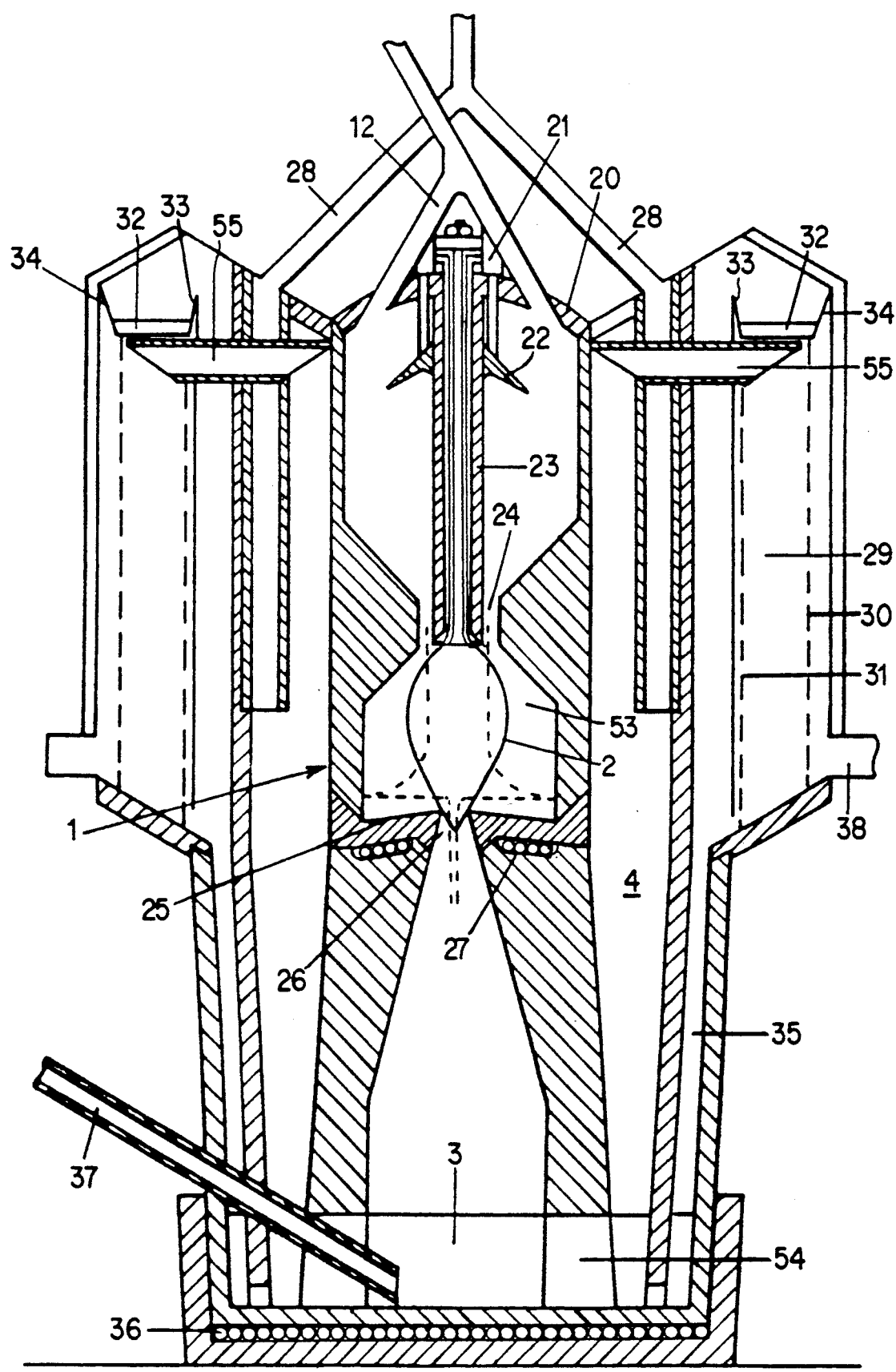
Figure 4:
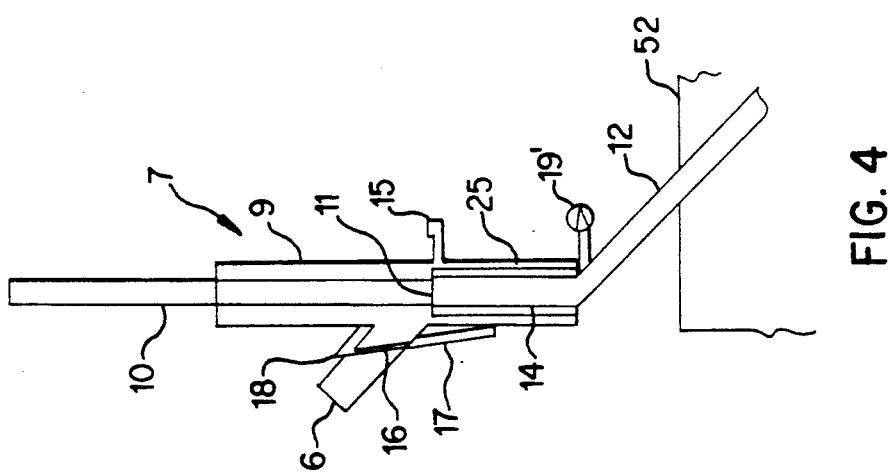
FIG. 4 shows an enlarged view of a detail of FIG. 3.
Figure 3:
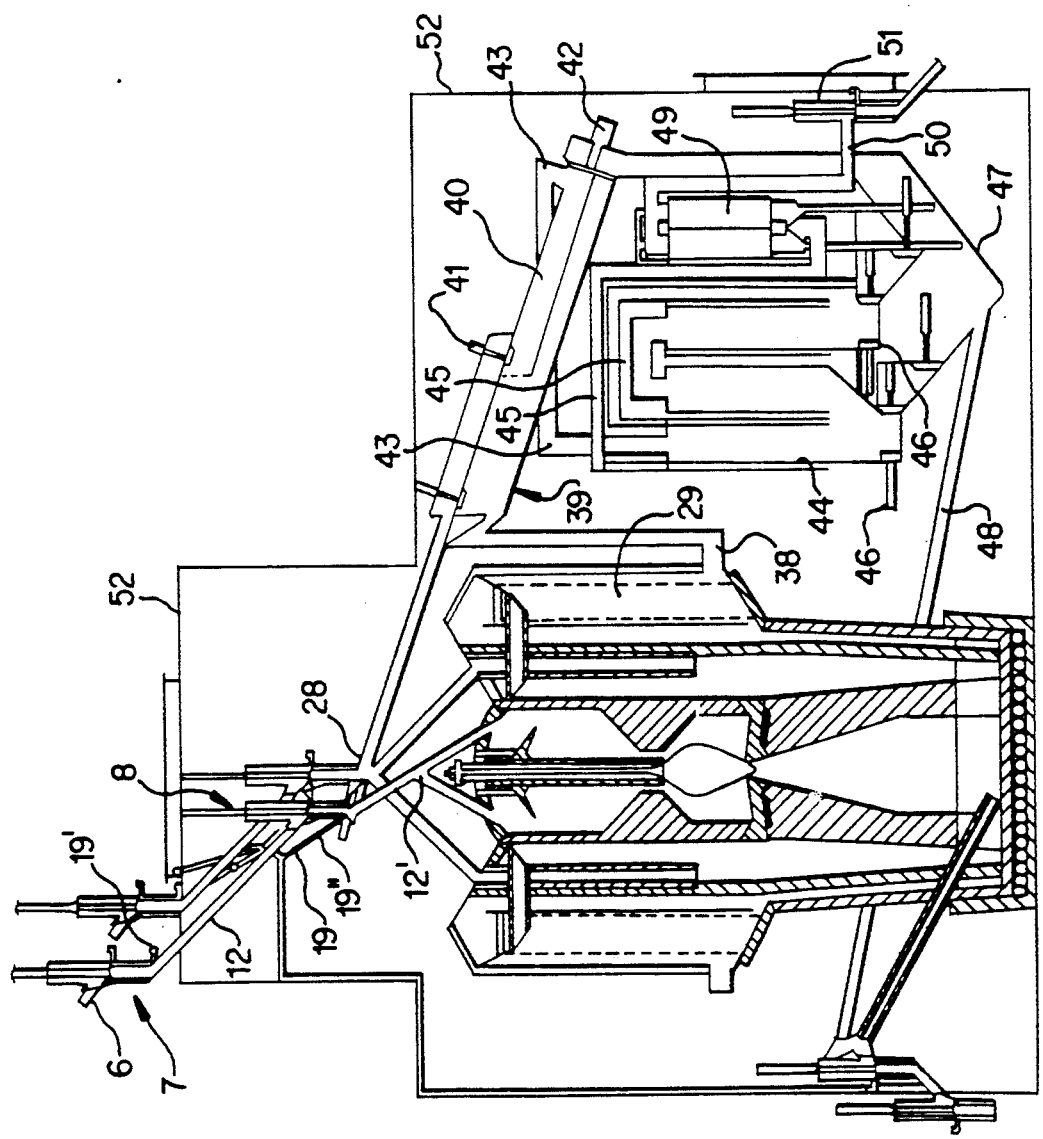
FIG. 3 gives a general view of a plant using the machine according to the invention.

Such a process may be successfully carried out by using the machine schematically shown in FIGS. 2 and 3.

As these figures show, the machine according to the invention consists of a disgregator 1, with an oxyhydrogen flame 2, connected by a pipe (breaking down, sorting, drying etc.) of the wastes.

Part of the above pipe 6 runs between two mercury valves 7, 8.

These valves have a cylindrical casing 9, on top of which is a hydraulic piston 10 to operate a "lid" 11 closing device in the exit pipe 12, 12'.

The sealing "lid" 11 is partially immersed in the mercury 13 contained in an interspace 14 connected to an expansion chamber 15.

The entry pipe 6 has an inclined gate 16 operated by a hydraulic piston 17, and on top there is an overhang 18 which, during opening, serves to protect the corresponding interspace 14.

The part of the pipe 12 between the two mercury valves 7, 8 has in its upper part an air aspiratory pump 19', and an aspiratory pump 19 connected to the interior of the disgregator 1 by a pipe 19".

Below the second mercury valve 8 the pipe 12' branches off to enter the flame disgregator 1.

This disgregator 1 is made of fireproof material and has a basically arched shape. Its arched covering 20 sustains a plurality of hydraulic pistons 21, which actuate a toroidal pusher 22, inside the disgregator 1, and a thermic lance 23.

The pusher 22 runs coaxially along the lance 23, the terminal part of which is positioned in correspondence to an internal annular neck 24 of the disgregator 1.

The bottom 25 of the disgregator 1, slightly convex so as to retain a certain amount of liquid material, has a central opening 26 for the passage of the products formed by the decomposition and has an internal coil 27 connected to a heat exchanger (not shown in the drawings).

The disgregator 1 is placed inside the substantially cylindrically shaped filter-thermoreactor 4 containing carbon.

To carry out its filling, the filter-thermoreactor 4 has an external pipe 28 with, at its extremity, two mercury valves identical to the valves 7, 8 already mentioned.

The filter-thermoreactor 4 is placed coaxially inside a refrigerator 29 of analogous shape, where there are two coaxial water films 30, 31, generated by two circular openings on the covering 32 of the refrigerator 29.

The covering 32 has two concentric annular walls 33, 34 to contain water and to condense the steam which comes, through a perimetral interspace 35 of said refrigerators 29, from the tank 3 full of water situated at the bottom of the said concentric structures.

The tank 3 has a coil 36 connected to a heat exchanger (not shown in the drawings). A conveyor belt 37 allows to remove from the machine the material deposited at the bottom of the tank 3.

The exit point of this conveyor belt 37 is placed between two mercury valves identical to those already mentioned.

A pipe 38 on the bottom of the refrigerator 29 connects it to a converter 39 made up of several concentric sections 40, each of which containing a different catalyst, according to which gas is to be obtained at exit. The sections 40 have water injectors (not shown in the drawings) and filling devices 41 for their connection to the external pipe 28.

The sections 40 of the converter 39 also have, at their base, devices 42 for unloading.

The converter 39 is connected by a pipe 43 to a freezer 44 cooled by a coil 45 connected to a conventional heat pump, not shown in the drawings, and equipped at its base by pushers 46 to unload along a chute 47 the ice and waste materials of the reactions.

A belt 48 at the bottom end of the chute 47 carries the ice from the chute 47 outside the machine.

The freezer 44 is connected to a self-cleaning hydrogen filter 49, in its turn connected to the exterior by a pipe 50 with a mercury valve 51 identical to those already described.

The whole is contained inside a casing 52 filled with inert gases, such as carbon dioxide, so as to avoid infiltrations of air into the machine and guarantee its safety.

The operating of the machine according to the invention is as follows:

the opportunely treated, broken down, sorted and dried material is sent through the pipe 6 to the mercury valve 7.

At pre-established intervals the hydraulic pistons 10 raises the lid 11, thus freeing the opening to the pipe 12 and thus allowing the mercury 13 that has overflowed into the chamber 15 to flow back into the interspace 14.

When the lid 11 has been completely raised, the inclined gate 16, worked by the hydraulic piston 17, starts to drop. The overhang 18 at the top of the gate 16 closes that part of the interspace 14 that could otherwise fill up with the material coming through the valve 7.

When the desired amount of material has passed through, the gate 16 recloses the pipe 6, while the lid 11 recloses the pipe 12. After the two phases, the pump 19' at the top of the pipe 12 is put into action to pump out any air that has come through the valve 7 with the material to be treated.

Once the vacuum is recreated in the pipe 12, the mercury valve 8 is opened with the same mechanism as for valve 7 and the material enters the disgregator 1 through the pipes 12'.

Any gases in the disgregator 1 may enter pipe 12' when the valve 8 is opened, but they are pumped out and sent back inside the disgregator by the aspirating pump 19' through the pipe 19".

The material accumulated inside the disgregator 1 is conveyed by the pusher 22 through the annular neck 24 which compresses it.

In this phase the material comes into contact with the thermic lance 23 cooling it, and acts as a plug for the underlying disgregation chamber 53.

In this way, escape of gases from there is partially interdicted and the upper part of the disgregator 1 is protected from the heat of the oxyhydrogen flame 2 that reaches about 2000° C.

The compressed material going through the neck 24, thanks to the particular shape of the oxyhydrogen flame 2 obtained by the inclination of the alimentary pipes, undergoes four decomposition, the first at the flame head and the second, third and fourth at the tail, as shown in the FIG. 2 by the broken line.

A part of the material that decomposes, gathers at the base 25 of the disgregator 1 thus shielding it from direct contact with the flame.

The liquid material and the gases through the neck 24, after further decomposition, fall into the tank 3 full of water maintained at a constant temperature by the coil 36. The solids that are deposited in the water tank 3 are removed by the conveyor belt 37 and unloaded outside.

The water, cooling the products of the decomposition, generates steam that mixes with the gases present: carbon dioxide, carbon monoxide etc. These gases, through a pipe 54 leading to the filter-thermoreactor 4, enter the latter which is filled with the carbonaceous mass through the external pipe 28. In the filter-thermoreactor 4 the carbon of the carbonaceous mass, thanks to the heat absorbed from the disgregator 1, reacts with the gases, thus producing carbon monoxide and hydrogen and further depurating the gases.

The gases thus obtained pass through a pipe 55 into the refrigerator 29, where they pass through the water films 30, 31 cooling down, stabilizing and further purifying themselves and balancing the $H_2O/CO$ ratio.

The cooled and $H_2O$ enriched gases enter the converter 39 with conversion columns with several catalyst layers, the first made up of $Fe_2O_3$—$Cr_2O_3$ and the second and third of $Cu$—$ZnO$—$Al_2O_3$.

In the first layer the exothermic reactions of conversion raise the temperature of the gases to 450° C.; before entering the second level, injections of water are effectuated to cool them down to 180° C.

In the second level the temperature of the gases rises to 250° C.; an intermediate cooling by water injections brings the entry temperature to the third level down to 200° C.

The hydrogen enriched gases leave the last level at 220° C. and enter the freezer 44 which lowers their temperature to about −70° C.

At entry to the freezer 44 the carbon dioxide, in the form of dry ice, is removed by the pushers 46 at the base of the freezer itself.

The pure hydrogen, the only residual gas, after passing through the self-cleaning filter 49 and the mercury valve 51, is brought outside the machine to be used as best seems fit.

The following example further clarifies the invention. Through the pipes 6, 12 and 12', 780 Kg/h of urban and industrial wastes having the following elementary composition are introduced into the disgregator:

| | |
|---|---|
| Carbon | 44.46% |
| Hydrogen | 9.89% |
| Nitrogen | 1.62% |
| Oxigen | 35.84% |
| Sulphur | 1.33% |

-continued

| | |
|---|---|
| Chlorine | 0.83% |
| Others | 6.03% |

The oxyhydrogen flame 2 that carrying the thermodecomposition uses 526 Kg/h of $O_2$ and 287 Kg/h of water.

The pure oxygen needed it furnished by a special generating station outside the machine, while the hydrogen is furnished by the machine itself.

At exit from the disgregator 1 after partial evaporation of the water contained in the cooling tank 3 there is a volume of 2598 $Nm^3/h$ of gas at 1400° C. having the following composition:

| | |
|---|---|
| CO | 22.3% |
| Hydrogen | 44.4% |
| $CO_2$ | 2.3% |
| $H_2O$ | 29% |
| Others | traces |

65 Kg/h of inert solid wastes are deposited in the water tank 3.

The thermodecomposition takes place totally without carbon black.

The high internal temperature of the disgregator 1 (2000° C.) and of the fireproof materials allows a thermic recovery of 50.000 Kcal/h.

2598 $Nm^3/h$ of gas enter the filter-thermoreactor 4 through the pipe 54; the gases react with 238 Kg/h Coke, furnishing 3023 $Nm^3/h$ of gas having the following composition:

| | |
|---|---|
| CO | 32.8% |
| Hydrogen | 56.2% |
| $H_2O$ | 11% |
| Others | traces |

These quantities of gas, before entering the converter 39 are stabilised and cooled from 800° C. to 380° C.

In the cooling process are used 607 Kg/h of water and 1098 Kg/h of steam to rebalance the $H_2O/CO$ ratio.

The gas, 3467 $Nm^3/h$ at a temperature of 380° C. enriched with water, enters the first layer of the converter 39 containing $Fe_2O_3$—$Cr_2O_3$ with which it reacts exothermically raising its temperature to 450° C.

Before entering the second level containing $Cu$—$ZnO$—$Al_2O_3$ the gas is cooled by water to 180° C. allowing a heat recovery of 512.000 Kcal/h.

In the second level of catalysts the temperature of the gas rises to 250° C.; an internal cooling process, that allows a heat recovery of 94.000 Kcal/h, brings the entry temperature to the third level to 200° C.

From the converter 39 5145 Nm/h issue at 220° C. having the following composition:

| | |
|---|---|
| Hydrogen | 49.8% |
| CO | 20% |
| $H_2O$ | 28% |

The hydrogen enriched gases issue from the converter 39 at 220° C. and enter the freezer 44 to be cooled down to −70° C.

2077 Kg/h of CO gather at the bottom of the freezer 44 in the form of ice which is removed by the conveyor belt 48. From the same freezer 44 are also recovered 229 Kg/h of hydrogen of which 66 Kg/h for the oxyhydrogen flame 2 of the disgregator 1 and 163 Kg/h for external utilisation. For example, should this hydrogen be used in a fuel cell, it is possible to obtain a development of about 2600 Kwh/h.

From what has been said it is clear that the process according to the invention and the machine to carry out it offer several advantages, and in particular:
high production of clean energy
total recovery of secondary materials
maximum safety
zero pollution
rapid recovery of construction costs
possibility to transform the machine into a non-polluting highly efficient propulsion system
use as a de-polluting machine.

I claim:

1. A process for transforming combustible pollutants and waste materials into clean energy and useful products, comprising the steps of:
   introducing pollutant and waste material to a thermic lance at a temperature higher than 1600° C. in an airless atmosphere for a time sufficient to totally decompose the material and extract combustible gaseous products based on $H_2$ and CO, non-combustible gaseous products and inert products, which are forwarded to the subsequent steps,
   cooling all together the thermally decomposed products and separating the inert products with water, thus generating steam and reducing the gases temperature at not less than 1200° C.,
   introducing said steam and said cooled gaseous products onto a depurative carbonaceous mass heated at a temperature higher than 1200° C., to remove the residual pollutants from the gaseous products and to transform the gaseous products, at least in part, into hydrogen, carbon monoxide and other wholly useful gaseous products, and
   cooling the gaseous products coming out from the depurative carbonaceous mass.

2. A process as claimed in claim 1 further comprising the step of applying the heat coming from the various cooling phases to pre-heat the material so as to bring said material to the predetermined content of humidity.

3. A process as claimed in claim 1 further comprising the step of compressing the material before introducing said material to said thermic lance.

4. A process as claimed in claim 3 wherein the step of compressing the material includes forcing said material through an entry aperture into a decomposition chamber.

5. A process as claimed in claim 4 wherein during the thermic decomposition of the material a bottom of the decomposition chamber is protected by previously decomposed material.

6. A process as claimed in claim 1 wherein thermic decomposition of the material is carried out by an oxyhydrogen flame of the thermic lance.

7. A process as claimed in claim 1 wherein the water used in the cooling process is superficially contacted by the thermally decomposed products to be cooled.

8. A process as claimed in claim 1 wherein all the inert products are collected at a single zone.

9. A process as claimed in claim 1 wherein heat from the thermic lance is recovered to transform gaseous products from the thermic decomposition and separation phase of the inert products into combustible gaseous products.

10. A process as claimed in claim 1 wherein the combustible gaseous products are stabilized and purified by passing said combustible gaseous products through at least one water film.

11. A process as claimed in claim 1 wherein carbon monoxide is converted with steam into hydrogen and carbon dioxide in the presence of catalysts.

12. A process as claimed in claim 11 wherein $Fe_2O_3$—$Cr_2O_3$ is used as a catalyst.

13. A process as claimed in claim 11 Cu—ZnO—$Al_2O_3$ is used as a catalyst.

14. A process as claimed in claim 11 wherein the carbon dioxide is frozen to obtain dry ice.

15. A process as claimed in claim 11 wherein the hydrogen is introduced to a purifying phase.

16. A process as claimed in claim 11 wherein the hydrogen is used to power a fuel cell.

17. An apparatus for transforming combustible pollutants and waste material into clean energy and useful products comprising:
   a) a thermic lance disgregator operating in the absence of air and at a temperature higher than 1600° C. for thermally decomposing pollutants and waste material from a source to form combustible gaseous products based on $H_2$ and CO, non-combustible gaseous products and inert products,
   b) a water separator to cool all the decomposed products and to separate the inert products with water, thus generating steam and reducing the gases temperature at not less than 1200° C.,
   c) a filter-thermoreactor containing a depurative carbonaceous mass heated at a temperature higher than 1200° C., said filter-thermoreactor being connected to said disgregator and to said separator to remove residual pollutants from the gaseous products and to transform the gaseous products, at least in part, into hydrogen, carbon monoxide and other wholly utilizable gaseous products, and
   d) a refrigerator for cooling said gaseous products coming out from said filter-thermoreactor.

18. An apparatus as claimed in claim 17 wherein said disgregator includes a covering of heatproof material, a lance having an oxyhydrogen flame surrounded by said heatproof material and a pusher to urge the material between said covering and said lance into the direction of said flame.

19. An apparatus as claimed in claim 18 wherein the part of the disgregator around the oxyhydrogen flame has a vault shape with means defining an opening for the passage of said lance and the pusher.

20. An apparatus as claimed in claim 18 wherein the disgregator around the oxyhydrogen flame has a bottom made of heatproof material with a conical shape for gathering decomposed material, the bottom having means defining a central opening for the passage of said decomposed material.

21. An apparatus as claimed in claim 20 wherein the conical bottom of the disgregator and/or a bottom of the separator are provided with heat regulating means.

22. An apparatus as claimed in claim 17 wherein said separator includes a tank underlying said disgregator.

23. An apparatus as claimed in claim 22 wherein said separator is provided with means to extract inert products.

24. An apparatus as claimed in claim 17 wherein said filter-thermoreactor includes a container of carbonaceous mass connected to said disgregator and said separator.

25. An apparatus as claimed in claim 24 wherein said filter-thermoreactor is concentrically disposed outside said disgregator such that both are connected to the underlying separator.

26. An apparatus as claimed in claim 25 wherein an inlet pipe for introducing said carbonaceous mass in said filter-thermoreactor emerges in the area of the disgregator influenced by the heat of the thermic lance.

27. An apparatus as claimed in claim 17 wherein each of an inlet of said disgregator, entry into said filter-thermoreactor and an outlet of said separator includes a seal valve.

28. An apparatus as claimed in claim 17 wherein said refrigerator includes two fluid film concentric cylinders.

29. An apparatus as claimed in claim 28 wherein said two cylinders of the refrigerator are placed coaxially outside the filter-thermoreactor.

* * * * *